United States Patent [19]
Wood et al.

[11] 3,733,796
[45] May 22, 1973

[54] HEADER HAVING HARVESTER REEL WITH TANGLE-PREVENTING FILLER PLATES THEREON

[75] Inventors: William Robert Wood; Donald E. Burrough, both of Ottumwa, Iowa

[73] Assignee: Deere & Company, Moline, Ill.

[22] Filed: Oct. 4, 1967

[21] Appl. No.: 672,853

[52] U.S. Cl. ..................... 56/220, 56/1 C, 56/226
[51] Int. Cl. ............................................. A01d 57/02
[58] Field of Search ..................... 56/1 C, 220–227

[56] References Cited

UNITED STATES PATENTS

| | | | |
|---|---|---|---|
| 2,608,283 | 8/1952 | Oehler | 198/9 |
| 2,717,690 | 9/1955 | Dukelow | 198/211 |
| 3,512,348 | 5/1970 | West et al. | 56/226 |
| 2,388,212 | 10/1945 | McElhoe et al. | 56/226 UX |
| 3,241,300 | 3/1966 | Fell et al. | 56/1 C X |
| 3,358,429 | 12/1967 | Claas | 56/21 |

OTHER PUBLICATIONS

Deere & Co., Advertising Brochure: "Low Cost Forage Harvester"; Pub. March, 1964, pages 7 & 19.

Primary Examiner—E. Barry Shay
Attorney—H. Vincent Harsha, Harold M. Knoth, William A. Murray and John M. Nolan

[57] ABSTRACT

A pull-type harvesting machine having a transverse mower bar, a finger-type harvester reel coextensive with and above the mower bar for sweeping the cop thereto and then upwardly and rearwardly to a pair of conditioner rolls which condition the crop and throw it rearwardly against windrow shields which deflect the crop into a windrow on the ground, the harvester reel being provided with a plurality of plates detachably mounted around the reel to enclose the reel interior.

9 Claims, 2 Drawing Figures

3,733,796

INVENTORS
W. R. WOOD
D. E. BURROUGH

HEADER HAVING HARVESTER REEL WITH TANGLE-PREVENTING FILLER PLATES THEREON

BACKGROUND OF THE INVENTION

This invention relates to a harvester reel for a combination mower-conditioner or the like.

Combination mower-conditioners are well known, most of the more recent designs of such machines having a mobile frame which supports a floating-type header, the header having a forwardly disposed, traverse knockdown bar spaced above the ground for bending the crop forwardly as the machine advances, a transverse cutter bar below and rearwardly of the knockdown bar for severing the crop from the ground, a pair of conditioner rolls rearwardly of the cutter bar for crushing or crimping the severed crop and discharging it rearwardly onto the ground in either a swath or a windrow, and a harvester reel above the cutter bar for feeding the crop to the cutter bar and then to the conditioner rolls.

Conventionally the machines utilize a finger-type harvester reel which includes a number of transverse rods equally spaced about its circumference. Rigidly attached to each rod are a large number of parallel, generally radially extending, spring-like, wire fingers.

The rods conventionally engage a cam at the end of the reel, so that the rods and the fingers mounted thereon rock about the axis of the rods as the reel rotates to position the fingers in their optimum position for feeding the crop to the cutter bar and conditioner rolls. In such a machine, as well as in other machines utilizing harvesting reels such as windrowers or the like, it is desirable to feed the material butt first to the conditioner rolls, or to the auger in the case of an auger-type windrower platform. In longer crops the knockdown bar bends the upper portion of the crop forwardly, while the reel fingers engage the lower portion of the crop to feed the crop butt first after it is severed from the field. However, in some shorter crops, the top of the crop passes beneath the knockdown bar before the crop is severed, and the crop moves to the cutter bar in an erect condition so that it can become entangled in the reel and is fed rearwardly in other than a butt-first orientation.

SUMMARY OF THE INVENTION

According to the present invention, arcuate filler plates are provided for detachable mounting about the circumference of the harvester reel to enclose the open spaces between the reel rods without interfering with the movement of the reel fingers. This eliminates the problem of crops becoming tangled within the reel. The filler plates are mounted so that the distance from the plate's outer surface to the axis of the reel decreases in the direction of reel rotation. Thus, in shorter crops the reel itself, as it rotates, acts as a knockdown bar, the crop being bent, regardless of height, to the desired angle just before cutting so as to insure uniform cutting and feeding. Since the filler plates are detachable, they can be provided as an optional attachment for new machines to be utilized in shorter crops; or they can be provided as attachments for machines already in the field.

DESCRIPTION OF THE PREFERRED EMBODIMENT

Figure 1:
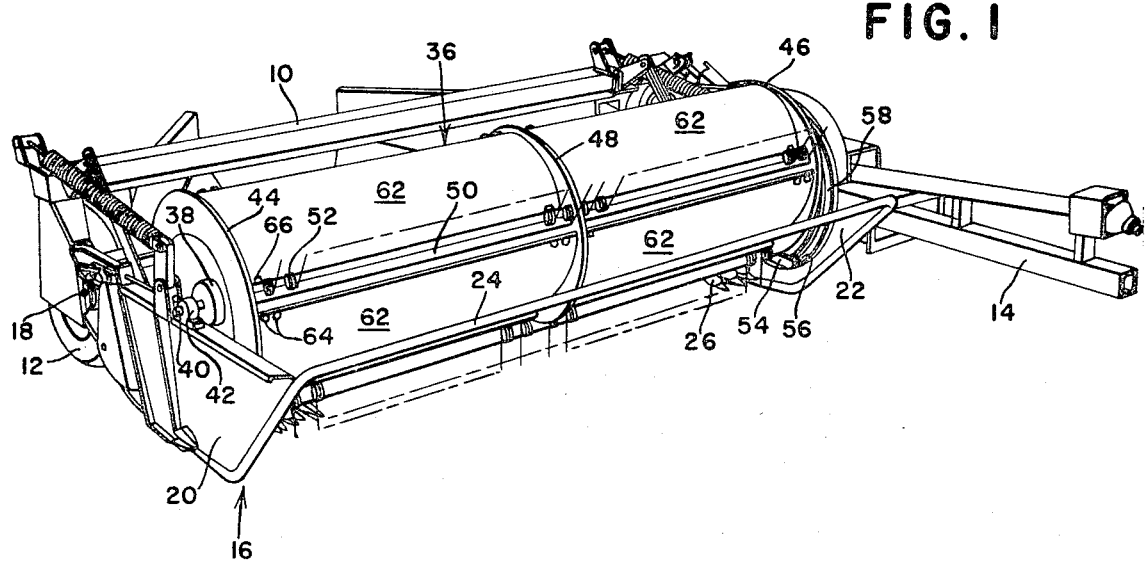
FIG. 1 is a right front perspective view of the combination crop harvester and conditioner embodying the present invention.

A typical crop mowing and conditioning machine is used here for the purpose of describing the present invention. With regard to this description, it is to be understood that such terms as "right", "left", and "transverse", are with reference to the direction of machine travel and that such terms, as well as terms such as "upwardly", "downwardly", "forwardly", "rearwardly", etc., are used to more clearly describe the invention.

The machine includes a mobile main frame 10 mounted on a pair of wheels 12, only one of which is shown in the drawings. The machine is conventionally connected to a towing tractor by a fore-and-aft extending draft member 14.

A forwardly disposed floating-type header, indicated in its entirety by the numeral 16, is swingable in a vertical arc on a transverse pivot 18 carried by the main frame 10. The header 16 includes upright, fore-and-aft extending, right and left side panels 20 and 22 respectively, connected at their forward ends by a transverse knockdown bar 24 and having their rearward ends supported on the pivot 18. A transverse mower bar 26 is supported by and extends between the lower edges of the side panels 20 and 22, and a crop handling means, here shown as a pair of conditioner rolls 28 and 30 is disposed parallel to and upwardly and rearwardly of the mower bar 26. The lower roll 30 has its opposite ends journaled in the side panels, while the upper roll 28 has its opposite ends journaled on a pair of bell cranks 32 which are swingable on the pivot 18 to permit the upper roll 28 to move toward and away from the lower roll 30, the upper roll being biased toward the lower roll by the weight of the header through a pair of rods 34 connecting the bell cranks 32 and the header, as described in assignee's copending U. S. patent application Ser. No. 628,938.

Also mounted on and extending between the side panels 20 and 22 is a finger-type harvester reel 36, which is coextensive with and above the mower bar 26, forwardly of the conditioner rolls 28 and 30 and rearwardly of the knockdown bar 24. The reel has a cylindrical center core 38 with a pair of shaft stubs 40 coaxially projecting from its opposite ends and journaled in a pair of bearings 42 respectively, mounted on the header side panels 20 and 22. Two relatively thin circular plates 44 and 46 are respectively coaxially attached to opposite ends of the center core, and a similar plate 48 is attached to the center of the core. These circular plates in turn rotatably carry four elongated transverse rods 50 circumferentially spaced at equal angular intervals about the perimeter of the reel. A plurality of double-tine spring-type fingers 52 are attached to and project radically from each rod 50 in the conventional manner, only a portion of the fingers being illustrated in FIG. 1.

Attached to the left end of each rod 50 is a relatively short lever arm 54 having a cam follower 56, which rides in a cam track 58 rigidly attached to the left side panel 22 and offset from the reel axis. As the reel 36 rotates about its axis in the direction of the arrow 59 in FIG. 2, the cam follower rides in the cam track, causing the lever arms 54, the rods 50, and the fingers 52 to rock about the axis of the rods in a manner predetermined by the cam, the fingers 52 feeding the crop to the cutter bar and conditioner rolls as best seen in FIG. 2.

Figure 2:
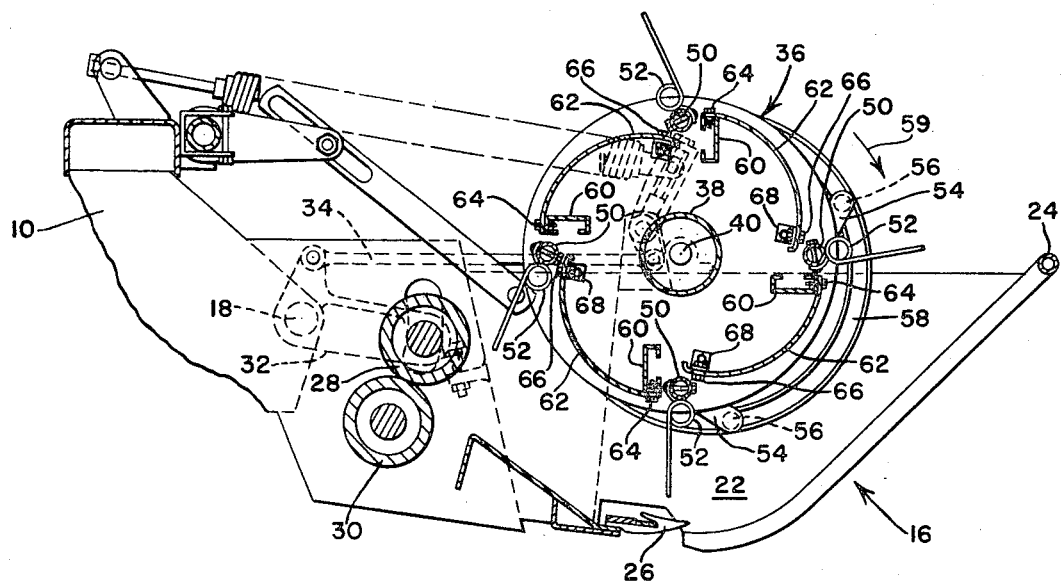
FIG. 2 is an enlarged, vertical, fore-and-aft section of the header portion of the machine.

Two sets of transverse support members 60 are uniformly positioned about the circumference of the reel 36, each support member being in close proximity to a rod 50 as shown in FIG. 2, one set of four members having its opposite ends rigidly attached to the center circular plate 48 and the right-hand plate 44, and the other set of four members having its opposite ends attached to the center plate and left-hand plate 46.

Four identical arcuate sheet metal filler plates 62 having an approximately quarter-cylindrical configuration are removably disposed between the adjacent support members 60 in each set of support members, the filler plates having a curvature approximately conforming to the circumference of the circular plates and being disposed in a generally edge abutting relationship with their concave sides facing the axis of the reel, so that each set of four filler plates forms a generally cylindrical structure substantially enclosing the reel interior between the center circular plate and the respective end circular plates.

The trailing end of each filler plate 62 is removably secured to the outer edge of the respective support member by a plurality of removable fasteners 64, here shown as bolts extending through corresponding holes in the plates and support members and secured therein by suitable nuts. The leading edge of each filler plate is slightly rounded and is radially offset from the reel axis a lesser distance than the trailing edge, the radius of the enclosed portion of the reel decreasing in the direction of reel rotation. The leading end of each filler plate is adjacent a finger supporting rod 50 and spaced a small distance from the corresponding support member, the leading end of each plate being removably secured to the respective circular plates by a pair of fasteners 66 adapted to secure the opposite ends of the filler plates to a pair of L-shaped brackets 68 having one leg attached to the respective circular plate and the other leg projecting transversely therefrom and engageable with the filler plate, the fasteners 66 being shown as bolts extending through the filler plate and brackets and secured therein by suitable nuts. The brackets 68 can be removably secured to the circular plates by removable fasteners or permanently attached thereto by welding or the like.

In operation the machine moves in a forwardly direction through a field of uncut crop, the knockdown bar bending the crop back away from the advancing machine so that as the cop is severed from the ground by the mower bar, it is fed butt first by the harvester reel to the conditioner rolls. The conditioned crop, as it emerges from the conditioner rolls, is thrown in a rearward direction onto the field behind the machine in a swath or, optionally, a windrow. The harvester reel guides the crop past the mower bar and up to the conditioner rolls primarily by means of the tines mounted about its perimeter, the tines maintaining an optimum position with respect to the reel for this purpose through the cam and a follower mechanism as the reel itself rotates with the advance of the machine.

Short crops will pass under the knockdown bar without being deflected in the desired manner, and lowering the knockdown bar below a certain point will result in uneven feeding of the crop. Hence, when the crop being harvested is short, the harvester reel or, more particularly, the filler plates mounted thereon rather than the knockdown bar bend the crop to the desired cut-and-feed position. This results in a smoother feeding of the crop past the mower bar and up to the conditioner rolls than would otherwise be possible. The smoothness of the feeding is further improved by the fact that the outer surface of each filler plate is recessed towards the center of the reel in the direction of reel rotation. In addition, the filler plates prevent the crop, regardless of its height, from becoming tangled in the center of the reel.

As is apparent from the drawings, the filler plates are readily attachable to or removable from the harvester reel and may be provided with the machine as an optional feature or supplied as an accessory package to be added to machines already in the field. This mode of fastening is also desirable in that it allows removal of the filler plates for cleaning or servicing of the reel.

We claim:

1. In combination with a harvesting machine having a harvesting header including a transverse mower bar, a crop-handling means coextensive with and rearwardly of the mower bar, and a rotatable, axially transverse, harvester reel mounted on the header above and coextensive with the mower bar forwardly of the crop-handling means and including a plurality of transverse rods equally offset radially from the reel axis at equiangular intervals, a plurality of resilient fingers mounted on each rod and projecting generally outwardly from the periphery of the reel, and cam and cam follower means connected to the rods for limited rocking of the rods and fingers about the axes of said rods, said reel being rotated so that the fingers move downwardly into the crop during the forward part of their travel, more rearwardly at the lower part of their travel to sweep the crop rearwardly to the mower bar and move upwardly during the rearward part of their travel to move the crop to the crop-handling means, the improvement comprising: a plurality of transversely elongated filler plates mounted on the reel between adjacent ones of said rods, each of said filler plates having opposite longitudinal edges respectively disposed parallel and proximate to the adjacent rods, at least one of said filler plates being mounted between each pair of adjacent rods so that the filler plates substantially close the interstices between the rods, the rods and the filler plates substantially enclosing the interior portion of the reel inwardly of the fingers.

2. The invention defined in claim 1 and including fastening means for detachably mounting the filler plates on the reel.

3. The invention defined in claim 1 wherein the filler plates have an arcuate cross section, the convex surface of the filler plates facing outwardly.

4. The invention defined in claim 3 wherein the filler plates are mounted on the reel so that the radial distance from the outer surface of the respective filler plate to the rotational axis of the reel decreases in the direction of reel rotation.

5. The invention defined in claim 3 wherein the trailing longitudinal edge of each said filler plate, with respect to the direction of rotation of the reel, is substantially the same radial distance from the reel axis as its adjacent rod, and the leading longitudinal edge of each said filler plate is a lesser radial distance from the reel axis than its adjacent rod.

6. The invention defined in claim 1 wherein at least two filler plates are disposed in end-to-end relationship between each said pair of adjacent rods.

7. The invention defined in claim 6 wherein the reel includes three circular plates respectively disposed at the opposite ends and at the center of the reel coaxial with the reel axis, and a pair of said filler plates are disposed between each said pair of adjacent rods and respectively extend between the center circular plate and the circular plates at the opposite ends of the reel.

8. The invention defined in claim 7 wherein the reel includes a plurality of transverse support members respectively extending between the circular plates adjacent the advance side of each said rod relative to the direction of reel rotation, the trailing edge of each said filler plate being attached to a transverse support member.

9. In combination with a harvesting machine having a harvesting header including a transverse mower bar, a crop-handling means coextensive with and rearwardly of the mower bar, and a rotatable, axially transverse, harvester reel mounted on the header above and coextensive with the mower bar forwardly of the crop-handling means and including a plurality of transverse rods equally offset radially from the reel axis at equiangular intervals, a plurality of fingers mounted on each rod and projecting generally outwardly from the periphery of the reel, and cam and cam follower means connected to the rods for limited rocking of the rods and fingers about the axes of said rods, said reel being rotated so that the fingers move downwardly into the crop during the forward part of their travel, move rearwardly during the lower part of their travel to sweep the crop rearwardly to the mower bar and move upwardly during the rearward part of their travel to move the crop to the crop-handling means, the improvement comprising: means mounted on said reel for preventing the crop from becoming entangled in the reel and for facilitating uniform feeding of said crop to said crop handling means, said reel means including a plurality of transversely elongated filler plates mounted on the reel between adjacent ones of said rods, each of said filler plates having opposite longitudinal edges respectively disposed parallel and proximate to the adjacent rods, at least one of said filler plates being mounted to extend between each pair of adjacent rods so that the filler plates substantially close the interstices between the rods, the rods and the filler plates substantially enclosing the interior portion of the reel inwardly of the fingers.

* * * * *